United States Patent
Cieutat et al.

(10) Patent No.: US 7,306,651 B2
(45) Date of Patent: Dec. 11, 2007

(54) METHOD FOR TREATMENT OF A GASEOUS MIXTURE COMPRISING HYDROGEN AND HYDROGEN SULPHIDE

(75) Inventors: Denis Cieutat, Neuilly s/Seine (FR); Guillaume De Souza, Issy les Moulineaux (FR); Serge Moreau, Velizy Villacoublay (FR); Pascal Tromeur, Cercottes (FR)

(73) Assignee: L'Air Liquide, Société Anonyme à Directoire et Conseil de Surveillance pour l'Etude et l'Exploitation des Procédés Georges Claude, Paris (FR)

( * ) Notice: Subject to any disclaimer, the term of this patent is extended or adjusted under 35 U.S.C. 154(b) by 418 days.

(21) Appl. No.: 10/504,501

(22) PCT Filed: Feb. 7, 2003

(86) PCT No.: PCT/FR03/00403

§ 371 (c)(1), (2), (4) Date: Feb. 22, 2005

(87) PCT Pub. No.: WO03/068366

PCT Pub. Date: Aug. 21, 2003

(65) Prior Publication Data

US 2005/0139069 A1    Jun. 30, 2005

(30) Foreign Application Priority Data

Feb. 15, 2002   (FR) ................... 02 01915

(51) Int. Cl.
*B01D 53/047* (2006.01)

(52) U.S. Cl. ................... 95/97; 95/103; 95/136; 208/212

(58) Field of Classification Search ............ 95/96, 95/97, 98–102, 103, 105, 55, 136, 143; 585/820; 208/100, 107, 209, 212
See application file for complete search history.

(56) References Cited

U.S. PATENT DOCUMENTS

| | | | | |
|---|---|---|---|---|
| 4,171,207 A | * | 10/1979 | Sircar | 95/101 |
| 4,457,834 A | * | 7/1984 | Caspers et al. | 208/143 |
| 5,102,854 A | * | 4/1992 | Delzer et al. | 502/410 |
| 5,203,888 A | * | 4/1993 | Maurer | 95/101 |
| 5,536,300 A | | 7/1996 | Reinhold, III et al. | |
| 5,792,239 A | | 8/1998 | Reinhold, III et al. | |

(Continued)

FOREIGN PATENT DOCUMENTS

DE    37 18 880 A1    12/1988

(Continued)

OTHER PUBLICATIONS

International Search Report for PCT/FR 03/00403.

*Primary Examiner*—Frank M. Lawrence
(74) *Attorney, Agent, or Firm*—Linda K. Russell

(57) ABSTRACT

A method of treatment of a gas mixture which contains $H_2$, $H_2S$ and possibly of other impurities, such as hydrocarbons. The treatment method is aimed at purifying the hydrogen mixture without incurring a overall pressure loss. The method according to the invention uses a device for pressure swing adsorption where the device includes an integrated compressor. In each adsorber of the device a pressure swing cycle is carried out which includes the steps of: adsorption, decompression, purge, and repressurization.

15 Claims, 3 Drawing Sheets

U.S. PATENT DOCUMENTS

| | | |
|---|---|---|
| 6,179,996 B1 | 1/2001 | Baker et al. |
| 6,190,540 B1 | 2/2001 | Lokhandwala et al. |
| 6,544,316 B2 * | 4/2003 | Baker et al. .................... 95/55 |
| 2003/0113598 A1 * | 6/2003 | Chow et al. .................. 429/17 |

FOREIGN PATENT DOCUMENTS

| | | |
|---|---|---|
| EP | 0 061 259 | 9/1982 |

* cited by examiner

METHOD FOR TREATMENT OF A GASEOUS MIXTURE COMPRISING HYDROGEN AND HYDROGEN SULPHIDE

BACKGROUND

The present invention relates to a process for treating a gas mixture comprising hydrogen, $H_2S$ and other components, such as hydrocarbons, with a view to separating the hydrogen from the other components of the mixture while maintaining it at the pressure of the initial gas mixture.

The present invention relates to the treatment of products coming from hydrotreatment (HT) processes very widely employed in the refining industry. Various types of hydrotreatment (HT) processes coexist in most refineries and are used for treating a large number of refining products, particularly the following cuts: gasoline, kerosene, diesel, vacuum distillates, oil bases. These hydrotreatment processes are used to adjust certain properties of the refining products, such as the contents of sulfur, nitrogen and aromatic compounds, or the cetane number. Sulfur is often the key property (the units are also often referred to as HDS (standing for hydrodesulfurization) units) and is the subject of increasingly stringent specifications leading refiners to seek ways of improving these units.

Chemical hydrogenation reactions take place in a reactor in which the hydrocarbon feed is mixed with a stream of hydrogen (in large excess) and passes over a catalyst bed. Some of the hydrogen reacts with the unsaturated organosulfur and organonitrogen compounds, producing hydrogen sulfide ($H_2S$), ammonia ($NH_3$), $C_1$-$C_6$ light hydrocarbons (HC) and saturated heavier compounds. On the downstream side of the reactor, a liquid/vapor separation tank is used to recover the hydrogen-rich gas phase, which is recycled in order to create this hydrogen excess (hereafter called the recycling gas). This gas contains, in addition to hydrogen, most of the volatile compounds that are created in the reactor and have a tendency to concentrate therein. The chemically consumed hydrogen, and also the hydrogen lost by mechanical losses, dissolution or purging is compensated for by a hydrogen-rich make-up gas, the composition of which varies depending on its mode of production. Typically, the hydrogen content of this gas (hereafter called the make-up gas) varies between 70 mol % and 99.9 mol %, the remainder generally being methane or a mixture of light hydrocarbons.

An essential parameter of the hydrotreatment reaction is the hydrogen partial pressure at the outlet of the reactor. This partial pressure depends on the total pressure of the unit (set during the "design" of the unit), on the degree of vaporization of the hydrocarbon feed (set by the total pressure and the operating temperature) and above all on the hydrogen concentration of the two gases—the make-up gas and the recycling gas—that are used. The $H_2S$ partial pressure is a second important parameter that depends mainly on the $H_2S$ content of the recycling gas, and therefore on the sulfur of the feed, and on the degree of desulfurization applied during the hydrotreatment. It is therefore desirable in hydrodesulfurization units to increase the hydrogen partial pressure and to reduce the $H_2S$ partial pressure by purifying either the make-up gas or the recycling gas, or both gases. The objective is therefore to reduce as far as possible the $H_2S$ and hydrocarbon contents.

The prior art has already proposed various solutions for achieving this objective. Thus, a first solution consists in purging the recycling gas in order to limit its $H_2S$ and hydrocarbon concentration: a fraction of the recycling gas is drawn off in order to remove the noncondensable gases that have built up in the recycling loop. These gases are discharged into what is called the "fuel gas" line; this line is present in all refineries and collects all the gaseous effluents that can be utilized in the form of energy. However, this high-pressure purge has several drawbacks:

the impact on the hydrogen and $H_2S$ partial pressures is slight;

since the recycling gas is rich in hydrogen, the primary consequence of the purge is the loss of hydrogen to the "fuel gas" line of the refinery. This hydrogen is then utilized since it is employed as fuel; and because of this loss, a larger amount of make-up gas has to be introduced. However, the make-up gas is compressed in order to go from the pressure of the hydrogen line to the operating pressure of the unit. The high-pressure purge is therefore limited by the capacity of the make-up gas compressor.

A second solution consists in employing a scrubbing step in which the recycling gas is scrubbed by an amine solution. During this scrubbing, $H_2S$ is completely absorbed and then desorbed by regeneration of the amine, and finally converted into liquid sulfur, for example in a Claus unit placed downstream. However, the scrubbing relates only to $H_2S$ and removes none of the hydrocarbons from the recycling gas. The impact on the $H_2S$ partial pressure is substantial, but the impact on the hydrogen partial pressure is negligible. The gain in hydrodesulfurization performance achieved thanks to this scrubbing therefore remains modest. In addition, the amine solutions pose corrosion and foaming problems.

A third solution of the prior art, which is very widely employed for $H_2$/$CO$/$CH_4$ mixtures, consists in purifying the hydrogen of the recycling gas by adsorption. This adsorption is used to achieve purity levels of higher than 99.5%. The application of adsorption to a hydrodesulfurization recycling gas is, for example, disclosed in JP 57055992. The adsorption treatment of the recycling gas or of the recycling gas mixture or of the make-up gas has substantial influence on the hydrodesulfurization performance. However, this solution has never been applied on an industrial scale to the treatment of these gases because of low yields. This is because the hydrogen yield of adsorption units is generally between 70 and 90%. The loss of hydrogen must therefore be compensated for by the use of a larger amount of make-up gas. The increase in the volume of make-up gas may be up to 100% in the case of the treatment of the entire recycling gas by a PSA (Pressure Swing Adsorption)-type process. The use of a PSA process therefore involves a high hydrogen cost; this is also greatly limited by the capacity of the make-up gas compressor and is in practice impossible without extensive investment.

A fourth solution of the prior art is the recovery of the hydrogen contained in the recycling gas by treating this gas using a hydrogen-permeable membrane. This type of membrane makes it possible to obtain high hydrogen purities (90 to 98%) and acceptable yields (80 to 98%, depending on the desired purity). The cost is moderate compared with the previous solutions. This solution has been described in the field of hydrodesulfurization units in EP-A-061 259. This solution is applied on an industrial scale, but the problem that remains is the need to recompress the recycling gas after it has passed through the membrane. This is because the purified hydrogen is produced at reduced pressure and the performance of the membrane is better the lower the production pressure. In practice, it is impossible to treat all the recycling gas. The membrane is therefore generally placed in a recycling gas branch and the hydrogen produced is sent to the intake of the make-up gas compressor in order to return to the pressure of the unit. The volume treated by the membrane, and consequently its effectiveness, is once again limited by the capacity of the make-up gas compressor.

A fifth solution is the use of reverse-selectivity membranes, which maintain the hydrogen under pressure. However, these membranes have low hydrogen/hydrocarbon selectivities (particularly in the case of hydrogen/methane separation). They therefore allow all of the recycling gas to be treated (as described in patents U.S. Pat. No. 6,190,540 and U.S. Pat. No. 6,179,996) in order to carry out more selective hydrocarbon purging, but a compromise between the loss of hydrogen and the degree of purification of the hydrogen has to be found. If the objective is the high purification of the recycling gas (with a hydrogen purity of 90%, or even 95%), then the hydrogen losses are very substantial (30% or 50%, or even higher) and the limitations are the same as those of a simple purge, (corresponding to the abovementioned first solution). If the objective is to reduce the hydrogen losses in comparison with a conventional high-pressure purge (as in the above first solution), then the purification and the impact on the hydrodesulfurization performance are very moderate. The last drawback is that the loss of hydrogen varies with the composition of the recycling gas to be treated—it is greater the richer the recycling gas to be treated is in hydrogen.

There is therefore a need to improve the hydrodesulfurization units of the prior art, and especially the treatment of the recycling gas and the use of this gas and of the make-up gas. The object of the invention is to propose a process for treating the gas coming from a hydrodesulfurization unit so as to obtain a recycling gas having a high hydrogen purity without reducing the pressure of the gas and without loss of hydrogen during this treatment.

SUMMARY

The invention relates to a process for separating a gas mixture by pressure spring adsorption, in which, for the or each adsorber, a pressure swing cycle comprising a succession of steps defining adsorption, decompression, purge and repressurization phases is carried out.

The process for treating a gas mixture comprising at least H2S and H2 and having a pressure P by means of a treatment device, comprises a pressure swing adsorption (PSA) unit associated with an integrated compressor, in which, for each adsorber of the PSA unit, a pressure swing cycle comprising a succession of phases that define adsorption, decompression, purge and repressurization phases, is carried out, in which:
  during the adsorption phase, at the pressure P, the gas mixture to be treated is brought into contact with the adsorber bed so as to adsorb the different components of the hydrogen and to produce, at the top of the adsorber bed, a gas comprising essentially hydrogen;
  during the decompression phase:
    a gas compressed to the pressure P' (<P), coming from the compressor integrated into the treatment device, called the recycle gas, is introduced into the adsorber bed and a PSA waste gas is produced;
  during the purge phase, a purge gas is produced;
  and in which the recycle gas is either the compressed waste gas or the compressed purge gas.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
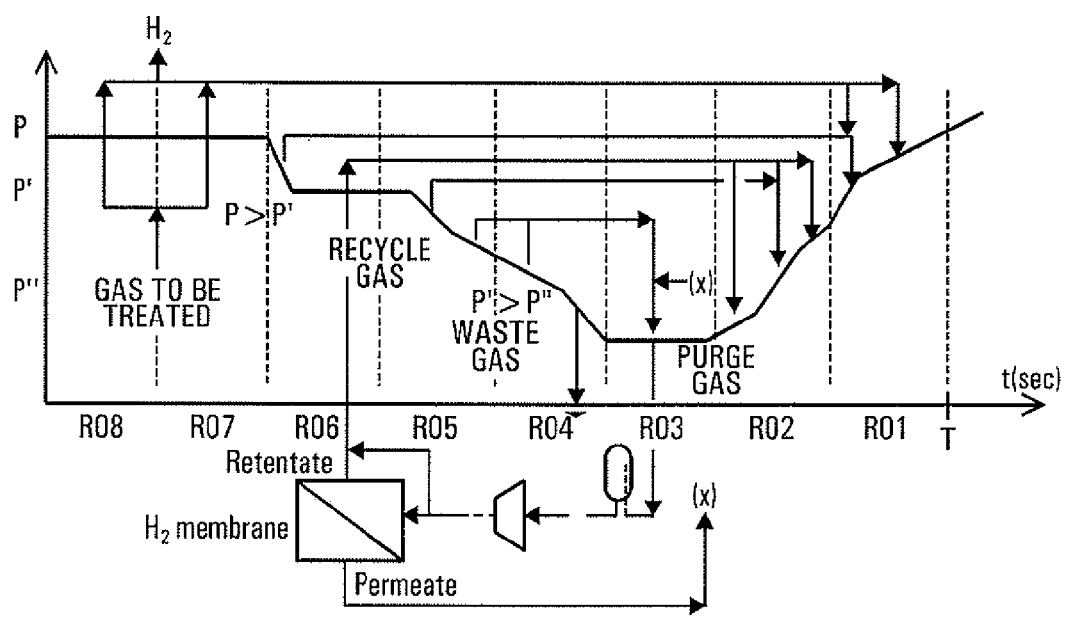
FIG. 1 illustrates one embodiment of the invention and its operating cycle.

The invention relates to a process for separating a gas mixture by pressure spring adsorption, in which, for the or each adsorber, a pressure swing cycle comprising a succession of steps defining adsorption, decompression, purge and repressurization phases is carried out. The invention can be employed with PSA cycles in which the adsorption is carried out at a pressure substantially above atmospheric pressure, typically around 3 to 50 bar, whereas the minimum pressure of the cycle is substantially equal to atmospheric pressure, or to a pressure of a few bar. These processes comprise various combinations of adsorption, decompression, purge and recompression steps in the adsorbers. In addition, in what follows, the terms "inlet" and "outlet" denote the inlet and outlet ends of an adsorber in adsorption phase; the term "cocurrent" denotes the direction of flow of the gas through the adsorber during this adsorption phase, and the term "countercurrent" denotes the opposite direction of flow.

The invention specifically relates to a process for treating a gas mixture comprising at least $H_2S$ and $H_2$ and having a pressure P by means of a treatment device comprising a pressure swing adsorption (PSA) unit associated with an integrated compressor, in which, for each adsorber of the PSA unit, a pressure swing cycle comprising a succession of phases that define adsorption, decompression, purge and repressurization phases, is carried out, in which:
  during the adsorption phase, at the pressure P, the gas mixture to be treated is brought into contact with the adsorber bed so as to adsorb the different components of the hydrogen and to produce, at the top of the adsorber bed, a gas comprising essentially hydrogen;
  during the decompression phase:
    a gas compressed to the pressure P'(<P), coming from the compressor integrated into the treatment device, called the recycle gas, is introduced into the adsorber bed and
    a PSA waste gas is produced;
  during the purge phase, a purge gas is produced;
  and in which the recycle gas is either the compressed waste gas or the compressed purge gas.

Other features and advantages of the invention will become apparent on reading the description which follows. In the rest of the description, the term "CPSA" will denote the treatment device comprising a pressure spring adsorption (PSA) unit associated with an integrated compressor used in the process according to the invention.

The object of the process according to the invention is to treat a gas mixture comprising at least $H_2S$ and $H_2$, which may be a stream coming from a hydrodesulfurization process. This stream may also include hydrocarbons. In general, the gas mixture to be treated has a temperature between 20 and 80° C., preferably between 30 and 50° C. In general it has a pressure between 15 and 80 bar absolute, preferably between 20 and 50 bar absolute. The composition of this type of mixture is usually the following:

- at least 0.2 mol %, preferably at least 0.5 mol %, generally at most 5 mol % and even more preferably between 1 and 2.5 mol % $H_2S$,
- between 60 and 98 mol % and preferably between 85 and 95 mol % hydrogen;

and if hydrocarbons are present:

- at most 20 mol % and preferably between 0.5 and 5 mol % $CH_4$;
- at most 10 mol % and preferably between 0.1 and 3 mol % $C_2$ hydrocarbons;
- at most 5 mol % and preferably between 0.05 and 1 mol % $C_3$ hydrocarbons;
- at most 2 mol % and preferably between 0.02 and 0.5 mol % $C_4$ hydrocarbons; and
- at most 0.5 mol % and preferably at most 0.06 mol % hydrocarbons having a carbon number greater than or equal to 5.

According to the process for the invention, during the adsorption phase, the gas mixture to be treated is brought into contact with a first adsorbent bed of the PSA unit: the gas mixture is introduced into the bottom part of the bed in the cocurrent direction. During this contacting step, the most adsorbable components other than $H_2$, essentially $H_2S$ and possibly the hydrocarbons, if they are present in the gas mixture to be treated, are adsorbed on the adsorbent and a gas comprising essentially hydrogen is produced at the pressure P reduced by about 1 bar of pressure loss. During this step, the hydrogen produced generally has a purity of greater than at least 97 mol %, preferably greater than at least 99 mol % or even greater than at least 99.5 mol %. In the case of the treatment of a gas coming from a hydrodesulfurization unit, the gas obtained, comprising essentially hydrogen, may be recycled into the hydrodesulfurization process since it possesses the hydrogen purity and the pressure that are needed for this type of hydrodesulfurization process.

To obtain effective purification, the adsorbent of the PSA beds must in particular allow the adsorption and desorption of $H_2S$ and of heavy hydrocarbons, such as pentane and hexane. The adsorbent bed is generally composed of a mixture of several adsorbents, said mixture comprising, for example, at least two adsorbents chosen from active carbons, silica gels, aluminas or molecular sieves. Preferably, the silica gels must have a pore volume of between 0.4 and 0.8 $cm^3/g$ and a specific surface area of greater than 600 $m^2/g$. Preferably, the aluminas have a pore volume of greater than 0.2 $cm^3/g$ and a specific surface area of greater than 220 $m^2/g$. The zeolites preferably have a pore size of less than 4.2 Å, with an Si/Al molar ratio of less than 5, and they contain Na and K. The active carbons preferably have a specific surface area of greater than 800 $m^2/g$ and a micropore size of between 8 and 20 Å.

According to a preferred embodiment, each PSA adsorbent bed is composed of at least three layers of adsorbents of different types. Each PSA adsorbent bed may comprise the following: in the bottom part, a protective layer composed of alumina and/or of silica gel surmounted by a layer of active carbon and/or of carbon-containing molecular sieve and, optionally, in the top part, a layer of molecular sieve. The proportions vary depending on the nature of the gas mixture to be treated (especially depending on its concentration of $CH_4$ and $C_{3+}$ hydrocarbons). For example, a gas mixture containing no water, comprising 75 mol % $H_2$, 5 mol % $C_{3+}$ and 20 mol % light ($C_1$-$C_2$) hydrocarbons, CO and $N_2$, may be treated by an adsorption unit whose beds comprise at least 10 vol % alumina and 15 vol % silica gel in the bottom bed, the remainder being obtained by active carbon.

During the decompression phase of the process according to the invention, several steps are employed, including at least a cocurrent first decompression step. After this cocurrent first decompression step, the decompression phase comprises a second step during which a gas compressed to the pressure P' (<P), called the recycle gas, is introduced cocurrently into the bed of the adsorber. This recycle gas is compressed directly or indirectly by the compressor integrated into the CPSA. According to one essential feature of the invention, two streams may constitute this recycle gas, individually or as a mixture, namely the waste gas coming from the PSA unit, which has been compressed, and the purge gas coming from the PSA unit, which has been compressed. Preferably, this is the purge gas and not the waste gas. The waste gas comes from the final step of the PSA decompression phase and is partly compressed by the compressor integrated into the PSA unit of the CPSA treatment device, whereas the purge gas comes from the PSA purge phase and is partly compressed by this same compressor integrated into the PSA unit, before being used as recycle gas. These two gases both comprise hydrogen and essentially $H_2S$, and possibly hydrocarbons if the gas mixture to be treated were to contain them, but in different proportions. Introducing them into the adsorbent bed allows them to be reprocessed. Thus, when they come into contact at the pressure P' with an adsorbent bed, on the one hand, the components other than hydrogen are adsorbed (thereby allowing the bed to be saturated with hydrocarbons and with $H_2S$) and, on the other hand, a gas comprising essentially hydrogen, is produced as overhead of the adsorbent bed, said gas therefore having an $H_2$ purity close to that of the gas coming from the adsorption step described above.

The decompression phase of the process according to the invention also generally includes at least one cocurrent decompression third step in which the adsorbent bed is brought to a pressure P''(<P') (thereby making it possible to reduce the hydrogen partial pressure of the internal gas phase of the adsorbent bed and to remove the hydrogen present in the dead volumes of the adsorber). This cocurrent decompression third step of the decompression phase produces a gas stream comprising essentially hydrogen, and therefore with an $H_2$ purity close to that of the gas coming from the adsorption step described above, that is to say with a hydrogen purity at least greater than 97 mol %. These gas streams comprising essentially hydrogen, that are produced during these second and third steps of the decompression phase are generally used:

- either during the purge phase;
- or to recompress a downstream adsorbent bed in the repressurization phase. The choice of the way in which they are used is made according to their pressure and therefore their possible use and not for recompressing a downstream adsorbent bed. Preferably, the cocurrent decompression step of the decompression phase, during which a gas stream comprising essentially hydrogen is produced, corresponds to the step during which a gas compressed to the pressure P' (<P), coming from the compressor integrated into the treatment device, called the recycle gas, is introduced into the adsorber bed. The third step of the decompression phase of the process according to the invention also results in the production of the waste gas of the PSA unit. According to the invention, this production of the waste gas may be obtained by countercurrent decompression initiated at the pressure P''' (<P') of the PSA unit. This waste gas comprises essentially $H_2S$, or even hydrocarbons, and is depleted in hydrogen, that is to say it has a hydrogen content of less than 25 mol %. This waste gas may be removed from the process and burnt or reutilized as recycle gas in the process according to the present invention as indicated above.

When the low pressure of the cycle has been reached, a purge phase is carried out in order to complete the regeneration of the adsorber. During the purge phase, a gas is introduced countercurrently into the adsorber and a purge gas is produced. This purge gas generally comprises between 40 and 85 mol % $H_2$. As indicated above, the gas introduced countercurrently into the adsorber during the purge phase is a gas stream coming from one of the steps of the decompression phase. After recompression, the purge gas is generally used as recycle gas; it may be mixed with a secondary gas source external to the CPSA unit, containing at least 30 vol % hydrogen before being compressed.

According to one particular process for implementing the invention, the purge gas and/or the waste gas coming from the compressor may be completely or partly treated in a hydrogen-permeable membrane before being used as recycle gas. In general, a hydrogen-selective membrane is used, which produces a permeate rich in hydrogen and a retentate rich in $H_2S$ and possibly hydrocarbons, depending on the nature of the gas mixture treated. It may be a membrane of the $H_2S$-resistant polymer type, for example one based on a polyimide or polyaramid, preferably a polyaramid (e.g. polyparaphehylene terephthalamide). The permeate gas coming from the hydrogen-permeable membrane may be mixed with one of the gas streams comprising essentially hydrogen coming from a cocurrent depressurization step before its use in the purge phase.

During the repressurization phase, the pressure of the adsorber is increased by countercurrently introducing a hydrogen-containing gas stream at a pressure greater than P''', such as the gas comprising essentially hydrogen produced at the pressure P during the adsorption phase and the gas comprising essentially hydrogen produced during the various steps of the decompression phase.

Preferably, the process involves at least four adsorbent beds placed cyclically under pressure one after the other. FIG. 1 illustrates one operating cycle of a CPSA unit comprising eight adsorbers (R01 to R08). In this figure, in which time t is plotted on the x-axis and absolute pressure P on the y-axis, the arrow-headed lines indicate the movements and destinations of the gas streams and also the direction of flow through the adsorbers. When an arrow is in the direction of increasing pressure values (upward in the plot), the stream is said to flow cocurrently through the adsorber. If the upwardly pointing arrow lies below the line indicating the pressure in the adsorber, the stream enters the adsorber via the inlet end of this adsorber. If the upwardly pointing arrow lies above the line indicating the pressure, the stream leaves the adsorber via the outlet end of this adsorber, the inlet and outlet ends being respectively those for the gas to be treated and for the gas withdrawn in production/adsorption phase. When an arrow is in the direction of decreasing pressure values (downward in the plot), the stream is said to flow countercurrently through the adsorber. If the downwardly pointing arrow lies above the line indicating the pressure in the adsorber, the gas stream enters the adsorber via the outlet end of the adsorber, the inlet and outlet ends again being those for the gas to be treated and for the gas withdrawn in production/adsorption phase. Each adsorber R01 to R08 follows the cycle shown in FIG. 1, each being shifted relative to the adsorber preceding it by a time called the "phase time" and equal to the duration T of the cycle divided by eight, that is to say divided by the number of adsorbers in operation. The cycle shown in FIG. 1 therefore comprises eight phase times and illustrates the "phase time/adsorber" duality, that is to say that at any instant in the operation of the CPSA unit, each adsorber is in a different phase time.

Thus, the gas to be treated is introduced into the adsorber R08, which is entering a first step of the adsorption phase at the pressure P, whereas the adsorber R07 is starting the second step of the adsorption phase at the same pressure. During these two steps of the adsorption phase, a gas comprising essentially hydrogen is produced.

The adsorber R06 is then in decompression phase. It undergoes a cocurrent decompression first step down to the pressure P': a gas stream is produced that is used for pressure balancing between the adsorbers R06 and R01. At the pressure P', the recycle gas is introduced cocurrently into the adsorber R06. During this step, the components other than hydrogen, such as $H_2S$ and hydrocarbons, contained in the recycle gas are adsorbed and a gas comprising essentially hydrogen is produced; this is a recycling step. The hydrogen produced in R06 is employed as gas for repressurizing the adsorber R02. The recycle gas is a gas compressed by the compressor integrated into the CPSA unit and comes, upstream of the compressor, from the adsorber R03 in purge phase. Successive cocurrent decompression of the adsorbers R04 and R05 allows the pressure P' to be lowered to the saturation pressure P''' of the adsorber R04. The decompression is carried out in two phases: firstly, by pressure balancing between the adsorbers R05 and R02 and secondly by successive cocurrent decompression of the adsorbers R05 and R04 in order to feed the downstream adsorber R03 in purge phase. The step of producing the waste gas of the CPSA unit, which is highly depleted in hydrogen, is then initiated by countercurrent depressurization of R04. The $H_2S$ and hydrocarbons are desorbed during this step. The adsorber R03 itself undergoes a purge step at the lowest pressure of the cycle. It is fed with the gas stream coming from the cocurrent depressurization of the adsorbers R04 and R05. The adsorber R03 produces a purge gas composed of 40 to 85 mol % $H_2$. The purge gas is compressed to the pressure P' by the compressor of the CPSA unit so as to form the recycle gas, which is introduced cocurrently into the adsorber R06. This recycle gas may optionally be mixed with a secondary feed external to the process and/or introduced into a hydrogen-permeable membrane before being introduced into R03. The permeate from the membrane, rich in hydrogen (with a purity of at least 80 mol %), is used to increase the productivity of the adsorbent by more effective purging of the adsorber R03; to do this, it is mixed with the gas stream coming from the cocurrent depressurization of the adsorbers R04 and R05. The adsorbers R02 and R01 undergo a succession of balancing recompression steps and repressurization steps by recycling some of the hydrogen produced until the adsorption pressure P at the end of compression of the adsorber R01 has been reached. The operation of the CPSA during the other phase times of the cycle is deduced from the above operation: the adsorber R01, then the adsorber R02, and so on as far as the adsorber R07 undergo the adsorption phase during the next phase time.

Figure 2:
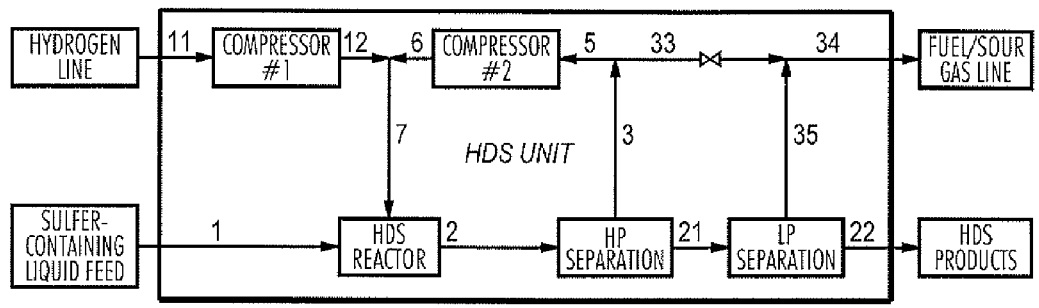
FIG. 2 illustrates a schematic of a conventional hydrodesulfurization unit.

The process according to the invention may be used for treating a gas mixture coming from a hydrodesulfurization unit. It may be employed at various locations in a conventional hydrodesulfurization unit. FIG. 2 shows a diagram of a conventional hydrodesulfurization (HDS) unit. A liquid hydrocarbon feed (1) to be treated, which comprises sulfur-containing molecules, is introduced into the hydrodesulfurization reactor (HDS reactor) as a mixture with a stream of gas (7) comprising essentially hydrogen. In the presence of a solid catalyst, many hydrogenation reactions take place in the reactor and in particular convert the organic sulfur-containing molecules into hydrogen sulfide $H_2S$. Leaving the reactor is a two-phase stream (2) that is sent into a high-pressure separation unit producing two streams, namely a stream (3) comprising essentially hydrogen and $H_2S$ and a stream (21) comprising mainly hydrocarbons and $H_2S$. The stream (21) is then generally expanded and treated in a low-pressure separation unit that produces two streams, namely a stream (22) comprising the hydrocarbons produced by the HDS unit and a stream (35) comprising essentially $H_2S$. The latter stream (35) is injected into the fuel/sour gas line of the refinery. The stream (3) may be divided into two portions:

one portion (5) is compressed by the recycling compressor (C2) so that it can be reused in the HDS reactor—this is the recycling gas (6), the other portion (33) is sent into one of the sour gas lines of the refinery. The line (33) includes a purge valve, which may be opened, for example to regulate the pressure of the unit.

The HDS unit is also fed with a fresh hydrogen stream (11) (this is the make-up gas) which is tapped off the hydrogen line of the refinery and then, if necessary, compressed by the make-up compressor (C1) up to the pressure of the HDS reactor in order to generate the stream (12). The compressed recycling gas (6) and the compressed make-up gas (12) form the hydrogen-rich gas stream (7) introduced into the HDS reactor.

Figure 3:
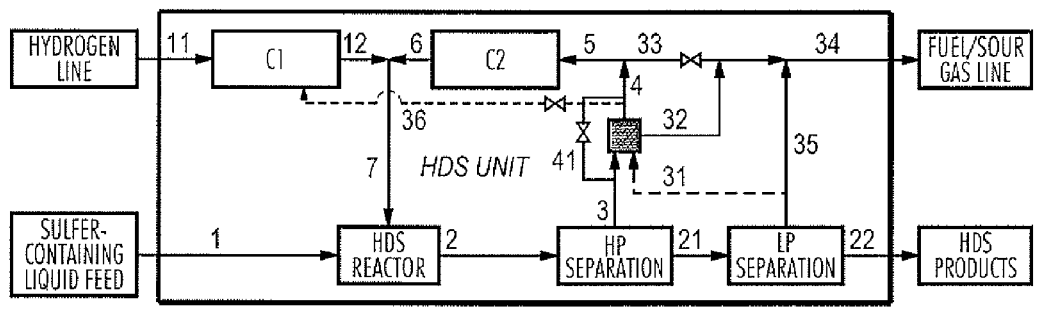
FIG. 3 illustrates one embodiment of the invention for treating a high-pressure gas mixture from a high-pressure separation unit of a hydrodesulfurization unit.

In a first variant of the invention, the process according to the invention may be used for treating the high-pressure hydrogen/$H_2S$ gas mixture (3) coming from the high-pressure separation unit of the hydrodesulfurization unit. This variant is illustrated in FIG. 3. The high-pressure hydrogen/$H_2S$ gas mixture (3) is introduced into the CPSA unit and treated according to the process for the invention. During the adsorption phase of the PSA unit, a hydrogen-rich gas (4) is recovered, at the outlet of the adsorber bed, with a pressure loss of less than 1 bar, which gas can be sent to the recycling compressor (C2) and then to the HDS reactor. During the decompression phase of the PSA unit, a waste gas (32), concentrating $H_2S$ and hydrocarbons, is recovered and may be fed into one of the fuel/sour gas lines of the refinery.

According to this first variant, it is possible to treat only a portion of the high-pressure hydrogen/$H_2S$ gas mixture (3) thanks to the bypass (41) of the CPSA unit. The line (33) may be opened in order to purge a fraction of the gas produced by the process according to the invention. According to this first variant, the process may be implemented in two optional modes.

According to a first optional mode, all or part of the effluent from the low-pressure separation section (31) may be mixed with the purge gas coming from the CPSA purge phase before it is introduced into the CPSA compressor and then optionally into the CPSA membrane. The low-pressure gas (31) may also come from another source having a hydrogen content of at least 30 vol %. This makes it possible to further reduce the hydrogen losses of the HDS unit. According to a second optional mode, all or part of the hydrogen-rich gas coming from the CPSA unit (4 then 36) may be sent to the existing multistage make-up compressor (C1) (for example between two compression stages). This makes it possible to relieve the recycling compressor (C2), which may sometimes be limited (for example owing to the low molecular weight of the gas to be compressed because of the purification).

Figure 4:
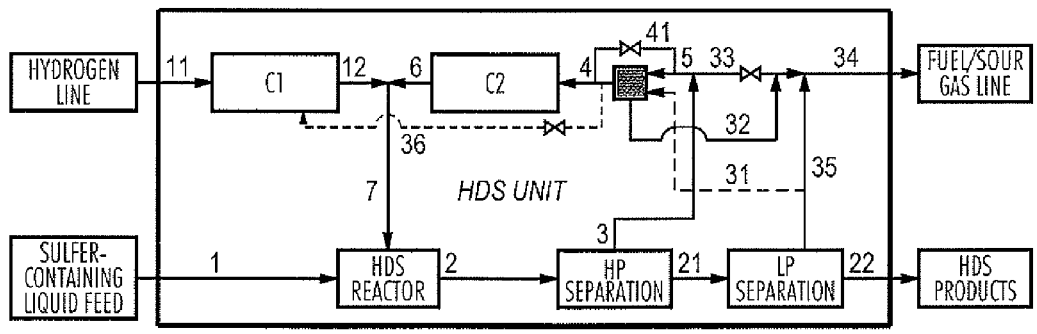
FIG. 4 illustrates a similar embodiment to that shown in FIG. 3, wherein the mixture is at the intake of a recycling compressor.

In a second variant of the invention, the process may be used for treating the high-pressure hydrogen/$H_2S$ gas mixture (5) coming from the high-pressure separation section when this mixture is at the intake of the recycling compressor (C2). This variant is illustrated in FIG. 4. In this case, the CPSA unit treats the high-pressure hydrogen/$H_2S$ gas mixture (5) at the intake of the recycling compressor (C2) and purifies it in order to produce:

a hydrogen-rich gas (4), with a pressure loss of less than 1 bar, sent to the recycling compressor (C2) and then to the HDS reactor; and a waste gas (32) concentrating $H_2S$ and the hydrocarbons and feeding one of the fuel/sour gas lines of the refinery.

It is possible to treat only a portion of the high-pressure hydrogen/$H_2S$ gas mixture (5) thanks to the bypass (41) of the CPSA unit. The purge valve (33) may be opened (for example to regulate the pressure of the unit) and then purges a fraction of the feed gas of the CPSA unit. Two streams are shown in dotted lines, corresponding to two optional modes. In a first optional mode, the CPSA unit may treat, in addition to the high-pressure hydrogen/$H_2S$ gas mixture (5), all or part of the effluent comprising essentially $H_2S$ from the low-pressure separation section (35 then 31), which further reduces the hydrogen losses of the HDS unit. This stream is sent to the intake of the CPSA compressor and then through the CPSA membrane. In a second optional mode, all or part of the hydrogen-rich gas (4) coming from a CPSA unit may be sent to the existing multistage compressor (C1) (for example between two compression stages) so as to relieve the make-up compressor (C2).

Figure 5:
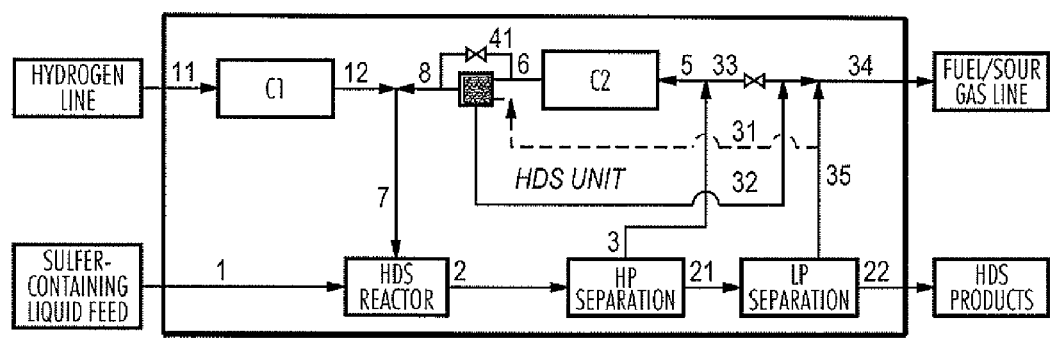
FIG. 5 illustrates another embodiment of the invention wherein the method is used for treating a compressed recycling gas delivered by the recycling compressor.

In a third variant of the invention, the process may be used for treating the compressed recycling gas (6) delivered by the recycling compressor (C2). It purifies it in order to produce:

on the one hand, a hydrogen-rich gas (8), with a pressure loss of less than 1 bar, which is sent to the HDS reactor; and on the other hand, a waste gas (32) rich in $H_2S$ and in hydrocarbons, which is sent into one of the fuel/sour gas lines of the refinery. This variant is illustrated in FIG. 5. It is possible to treat only a portion of the compressed recycling gas (6) owing to the presence of a bypass (41) of the CPSA unit. The purge valve (33) may be opened (for example to regulate the pressure of the unit) and may purge a fraction of the gas coming from the high-pressure separation section. In one optional mode, all or part of the effluent comprising essentially $H_2S$ from the low-pressure separation section (35 then 31) may be mixed with the gas for purging the adsorbent bed before it is introduced into the compressor and then optionally into the membrane. This makes it possible to further reduce the hydrogen losses of the HDS unit.

Figure 6:
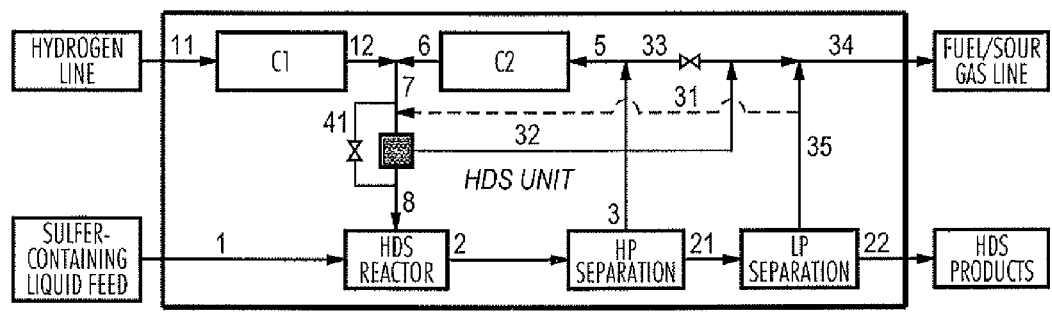
FIG. 6 illustrates another embodiment of the invention wherein the gas mixture consists of the recycling gas and a make-up gas from a hydrogen line.

In a fourth variant, the process may be used to treat the gas mixture (7) consisting of the recycling gas (6) and of the make-up gas (12), (coming from the hydrogen line). This variant is illustrated in FIG. 6. The process produces a gas (8) comprising essentially hydrogen, with a pressure loss of less than 1 bar, which is sent into the HDS reactor, and a waste gas (32) concentrating $H_2S$ and the hydrocarbons and feeding one of the fuel/sour gas lines of the refinery. This configuration is useful when the purity of the make-up gas is low. It is possible to treat only a portion of the mixture (7) consisting of the recycling gas (6) and of the make-up gas (12) owing to the presence of a bypass (41). The purge valve (33) may be opened (for example to regulate the pressure of the unit) and may purge a fraction of the gas coming from the high-pressure separation section. In an optional mode, all or some of the effluent comprising essentially $H_2S$ from the low-pressure separation section (35 then 31) may be mixed with the gas for purging the adsorbent bed before it is introduced into the compressor and then optionally into the membrane. This makes it possible to further reduce the hydrogen losses of the HDS unit.

The process for the invention makes it possible to achieve hydrogen yields in the recycling gas of greater than 95%. The hydrogen-selective membrane makes it possible to reduce the energy needed to compress the purge effluent and to increase the productivity of the adsorbent, or to reduce its size.

The invention therefore allows purification of the recycling gas of a hydrodesulfurization unit, combining at the same time high purity (at least equal to 97 mol %), a high yield (greater than 95%) and the production of hydrogen under pressure (the pressure difference between the gas mixture to be treated and the purified hydrogen obtained being less than 1 bar). The process according to the invention therefore allows the complete treatment of the recycling gas and optionally of the make-up gas. The induced impact on the refining unit is thus very much greater than that obtained with any other solution of the prior art. The invention makes it possible to obtain in the hydrodesulfurization unit a hydrogen partial pressure between +10% and +60% and an $H_2S$ partial pressure at the outlet of the reactor between −50% and −80%. This impact on the partial pressures is manifested by an improvement in the performance, which can be expressed in various ways:

the sulfur content in the hydrocarbons produced by the hydrodesulfurization unit is reduced by −30 to −80%;

the operating temperature is equivalent to the base temperature of +10 to 25° C.; and the amount of catalyst consumed is reduced by 35 to 50%.

EXAMPLE

The table below compares the results obtained during the use of a conventional PSA unit, by implementing the process according to the invention without a hydrogen-selective membrane and with a hydrogen-selective membrane, the volume of adsorbent being the same. The gas mixture treated was composed of 90 mol % $H_2$, 2 mol % $H_2S$ and 8 mol % hydrocarbons (including 4 mol % $CH_4$).

The adsorbent was a combination of at least two adsorbents taken from the following families: active carbon, activated aluminas, silica gels, zeolites.

The pressure of the feed gas was 35 bar. The pressure of the waste gas was 6 bar. The mean temperature of the adsorbent beds was 40° C.

|  | Purity of the $H_2$ produced | $H_2$ yield | Production capacity in $Sm^3/h$ |
|---|---|---|---|
| PSA | 98.5% | 84.3% | 30 000 |
| Process according to the invention without hydrogen-selective membrane | 98.5% | 97.8% | 54 000 |
| Process according to the invention with hydrogen-selective membrane | 98.5% | 98.1% | 73 500 |

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method which may be used for treating a gas mixture at an initial pressure, wherein said gas mixture comprises $H_2S$ and $H_2$, comprising treating said gas mixture with a treatment device, wherein said device comprises a pressure swing adsorption (PSA) unit with an integrated compressor and wherein each adsorber of said unit comprises a pressure swing cycle, wherein said cycle comprises:
    a) an adsorption phase, wherein said adsorption phase comprises:
        1) contacting said gas mixture with the adsorber bed so as to adsorb the different components of said gas mixture; and
        2) producing at the top of said bed, a gas consisting essentially of hydrogen;
    b) a decompression phase, wherein said decompression phase comprises:
        1) introducing a recycle gas to said bed, wherein said recycle gas is compressed by said compressor to a second pressure which is less than said initial pressure; and
        2) producing a PSA waste gas;
    c) a purge phase, wherein said purge phase comprises producing a purge gas; and
    d) a repressurization phase.

2. The method of claim 1, wherein said recycle gas comprises at least one member selected from the group consisting of:
    a) said purge gas; and
    b) said PSA waste gas.

3. The method of claim 1, wherein said gas mixture comprises a stream from a hydrodesulfurization process.

4. The method of claim 1, wherein said gas consisting essentially of hydrogen has a pressure about 1 bar less than said initial pressure.

5. The method of claim 1, wherein said gas comprises a purity greater than about 97% mol.

6. The method of claim 3, further comprising recycling said gas into said hydrodesulfurization process.

7. The method of claim 1, wherein said decompression phase further comprises decompressing said bed.

8. The method of claim 7, wherein said decompression phase further comprises:
   a) producing a second gas stream consisting essentially of hydrogen; and
   b) using said second gas stream, wherein said using comprises at least one member selected from the group consisting of:
      1) using during said purge phase; and
      2) using to recompress a downstream adsorbent bed during said repressurization phase.

9. The method of claim 8, wherein said production of said second gas stream corresponds to said introduction of said recycle gas.

10. The method of claim 1, further comprising treating a membrane gas in a hydrogen-permeable membrane prior to using said membrane gas as said recycle gas, wherein said membrane gas further comprises at least one member selected from the group consisting of:
   a) said purge gas; and
   b) said waste gas.

11. The method of claim 1, wherein said gas mixture comprises a high-pressure gas mixture from a high-pressure separation unit of a hydrodesulfurization unit.

12. The method of claim 11, wherein said high-pressure gas mixture is from the intake of the recycling compressor of said hydrodesulfurization unit.

13. The method of claim 3, wherein said gas mixture comprises a compressed recycling gas delivered by the recycling compressor of a hydrodesulfurization unit.

14. The method of claim 3, wherein said gas mixture comprises a mixture of said recycling gas and the make-up gas of a hydrodesulfurization unit.

15. A method for the hydrogenation and treatment of a hydrocarbon feed, comprising:
   a) creating products by hydrogenating said hydrocarbon feed;
   b) obtaining a gas phase consisting of essentially $H_2$, $H_2S$ and light hydrocarbons, by condensing said products;
   c) treating said gas phase by with a treatment device, wherein said device comprises a pressure swing adsorption (PSA) unit with an integrated compressor and wherein each adsorber of said unit comprises a pressure swing cycle, wherein said cycle comprises:
      1) an adsorption phase, wherein said adsorption phase comprises:
         i) contacting said gas phase with the adsorber bed so as to adsorb the different components of said gas phase; and
         ii) producing at the top of said bed, a gas consisting essentially of hydrogen;
      2) a decompression phase, wherein said decompression phase comprises:
         i) introducing a recycle gas to said bed, wherein said recycle gas is compressed by said compressor to a second pressure which is less than said initial pressure of said gas phase; and
         ii) producing a PSA waste gas;
      3) a purge phase, wherein said purge phase comprises producing a purge gas; and
      4) a repressurization phase; and
   d) recycling said gas produced at said top of bed into said hydrocarbon feed.

* * * * *